US012722628B2

(12) United States Patent
Shami

(10) Patent No.: US 12,722,628 B2
(45) Date of Patent: Sep. 1, 2026

(54) STEERING WHEEL CONTROL FOR IMMINENT VEHICLE COLLISIONS

(71) Applicant: GM GLOBAL TECHNOLOGY OPERATIONS LLC, Detroit, MI (US)

(72) Inventor: Constandi John Shami, Bahama, NC (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 18/923,780

(22) Filed: Oct. 23, 2024

(65) Prior Publication Data

US 2026/0109345 A1 Apr. 23, 2026

(51) Int. Cl.
*B60W 30/09* (2012.01)

(52) U.S. Cl.
CPC ....... *B60W 30/09* (2013.01); *B60W 2420/403* (2013.01); *B60W 2540/18* (2013.01)

(58) Field of Classification Search
CPC ....... B60W 2540/18; B60W 2420/403; B60W 30/09
USPC .......................................................... 701/301
See application file for complete search history.

(56) References Cited

U.S. PATENT DOCUMENTS

| | | | | |
|---|---|---|---|---|
| 9,694,777 | B2 | 7/2017 | Nolte et al. | |
| 2019/0118849 | A1* | 4/2019 | Cazzoli | B60R 21/0134 |
| 2020/0307564 | A1* | 10/2020 | Rahimi | G06N 3/08 |
| 2023/0311888 | A1* | 10/2023 | Kato | G06V 20/58 701/41 |

FOREIGN PATENT DOCUMENTS

| | | | |
|---|---|---|---|
| DE | 102014004570 | A1 | 10/2015 |
| DE | 102011120778 | B4 | 5/2018 |
| DE | 102018102103 | A1 | 8/2019 |
| DE | 112019000257 | T5 | 10/2020 |

OTHER PUBLICATIONS

German Office Action from counterpart DE1020241378131, dated Jul. 31, 2025.

* cited by examiner

*Primary Examiner* — Yazan A Soofi

(57) ABSTRACT

A vehicle system for reducing an injury risk of a driver in a vehicle, includes a control module configured to detect whether a collision is imminent with respect to the vehicle, determine a hand position of the driver on a steering wheel in the vehicle, in response to detecting the imminent collision, decouple the steering wheel and a road wheel assembly in the vehicle to allow both to move independently of each other, and in response to determining the hand position of the driver is in an injury zone, control the steering wheel to move to a target position before the collision. Other example vehicle systems and control methods are also disclosed.

20 Claims, 7 Drawing Sheets

STEERING WHEEL CONTROL FOR IMMINENT VEHICLE COLLISIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to steering wheel control for imminent vehicle collisions.

A vehicle includes a steering system for controlling a driving direction of the vehicle. A driver may rotate a steering wheel an angular amount to change the direction of the vehicle. The rotational movement of the steering wheel is transferred to a vehicle tie rod or a road wheel actuator. For example, the rotational movement of the steering wheel may be transferred via a mechanical connection between the steering wheel and the tie rod or via an electrical connection (e.g., a signal) to the road wheel actuator having a rack and a pinion. With respect to the road wheel actuator, the pinion is actuated based on the rotational movement of the steering wheel to cause translation of the rack and movement of the vehicle wheels. Such steering systems are often referred to as steer-by-wire systems.

SUMMARY

A vehicle system for reducing an injury risk of a driver in a vehicle, includes a control module configured to detect whether a collision is imminent with respect to the vehicle, determine a hand position of the driver on a steering wheel in the vehicle, in response to detecting the imminent collision, decouple the steering wheel and a road wheel assembly in the vehicle to allow both to move independently of each other, and in response to determining the hand position of the driver is in an injury zone, control the steering wheel to move to a target position before the collision.

In other features, the vehicle system further includes one or more sensors in communication with the control module. The one or more sensors include at least one of a touch sensor positioned on the steering wheel and a camera, and the control module is configured to determine a hand position of the driver on the steering wheel in the vehicle based on data from the one or more sensors.

In other features, the hand position corresponds to one hand of the driver, and the control module is configured to determine a steering wheel angle of the steering wheel, determine a relative hand position based on the steering wheel angle and the determined hand position corresponding to the one hand of the driver; and control the steering wheel to move based on the relative hand position.

In other features, the vehicle system further includes an actuator coupled to the steering wheel, and the control module is configured to determine a delta angle based on the relative hand position and the target position and control the actuator based on the delta angle to move the steering wheel.

In other features, the hand position of the driver includes a right-hand position and a left-hand position and the target position includes a target right-hand position and a target left-hand position.

In other features, the control module is configured to determine a steering wheel angle of the steering wheel, determine a relative right-hand position of the driver based on the steering wheel angle and the right hand position, determine a relative left-hand position of the driver based on the steering wheel angle and the left-hand position and control the steering wheel to move based on the relative right-hand position, the relative left-hand position, the target right-hand position, and the target left-hand position.

In other features, the target right-hand position is a first defined range, the target left-hand position is a second defined range, the vehicle system further includes an actuator coupled to the steering wheel, and the control module is configured to determine a delta angle based on the relative right-hand position, the relative left-hand position, the first defined range, and the second defined range and control the actuator based on the delta angle to move the steering wheel.

In other features, the control module is configured to detect the collision, determine a realignment angle based on a target steering wheel angle and a current steering wheel angle, and control the steering wheel to move based on the realignment angle.

In other features, the control module is configured to determine the target steering wheel angle based on a vehicle path after the collision.

In other features, the control module is configured to recouple the steering wheel and the road wheel assembly.

A vehicle system for reducing an injury risk of a driver in a vehicle, includes one or more sensors configured to detect vehicle characteristics, an actuator coupled to a steering wheel in the vehicle, and a control module. The control module is configured to detect whether a collision is imminent with respect to the vehicle based on the detected vehicle characteristics, in response to detecting the imminent collision, decouple the steering wheel and a road wheel assembly in the vehicle to allow both to move independently of each other and control the actuator to move the steering wheel to a target position before the collision, and in response to detecting the collision, determine a realignment angle based on a target steering wheel angle for a vehicle path after the collision, control the actuator to move the steering wheel based on the realignment angle to realign the steering wheel for the vehicle path after the collision, and recouple the steering wheel and the road wheel assembly.

In other features, the control module is configured to determine a hand position of the driver on the steering wheel, determine a steering wheel angle of the steering wheel, determine a relative hand position based on the steering wheel angle and the determined hand position, and control the actuator to move the steering wheel to the target position based on the relative hand position.

A control method for reducing an injury risk of a driver in a vehicle, includes detecting whether a collision is imminent with respect to the vehicle, determining a hand position of the driver on a steering wheel in the vehicle, in response to detecting the imminent collision, decoupling the steering wheel and a road wheel assembly in the vehicle to allow both to move independently of each other, and in response to determining the hand position of the driver is in an injury zone, controlling the steering wheel to move to a target position before the collision.

In other features, determining the hand position of the driver on the steering wheel includes determining the hand position based on driver characteristics detected by at least one of a touch sensor positioned on the steering wheel and a camera.

In other features, the hand position corresponds to one hand of the driver, and control method further includes determining a steering wheel angle of the steering wheel and determining a relative hand position of the driver based on the steering wheel angle and the determined hand position corresponding to the one hand of the driver.

In other features, controlling the steering wheel to move to the target position includes controlling the steering wheel to move based on the relative hand position.

In other features, the control method further includes determining a delta angle based on the relative hand position and the target position.

In other features, controlling the steering wheel to move to the target position includes controlling an actuator coupled to the steering wheel based on the delta angle.

In other features, the hand position of the driver includes a right-hand position and a left-hand position and the target position includes a target right-hand position and a target left-hand position.

In other features, the control method further includes determining a steering wheel angle of the steering wheel, determining a relative right-hand position of the driver based on the steering wheel angle and the right-hand position, and determining a relative left-hand position of the driver based on the steering wheel angle and the left-hand position.

In other features, controlling the steering wheel to move to the target position includes controlling the steering wheel to move based on the relative right-hand position, the relative left-hand position, the target right-hand position, and the target left-hand position.

In other features, the target right-hand position is a first defined range, the target left-hand position is a second defined range, and the control method further includes determining a delta angle based on the relative right-hand position, the relative left-hand position, the first defined range, and the second defined range.

In other features, controlling the steering wheel to move to the target position includes controlling an actuator coupled to the steering wheel based on the delta angle to move the steering wheel.

In other features, the control method further includes detecting the collision, determining a realignment angle based on a target steering wheel angle and a current steering wheel angle, and controlling the steering wheel to move based on the realignment angle.

In other features, the control method further includes determining the target steering wheel angle based on a vehicle path after the collision.

In other features, the control method further includes recoupling the steering wheel and the road wheel assembly.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may rely on a steer-by-wire system for controlling vehicle driving directions. In such examples, rotational movement of a steering wheel in the vehicle is transferred via one or more signals to a road wheel actuator, which in turn causes movement of the vehicle road wheels. Conversely, if the road wheels move, one or more signals are transferred to a steering wheel actuator, which in turn causes the steering wheel to rotate based on the movement of the road wheels.

During a collision involving the vehicle (e.g., a vehicle accident, etc.), the driver's hands are often placed on and gripping the steering wheel. In some cases, the road wheels may move as a result of a collision, thereby causing the steering wheel to rotate. Such rotation may cause one or more injuries to the driver due to the driver's hands moving with the steering wheel. In other cases, the driver's hands may be in a position on the steering wheel where injuries are likely to occur in the event of a collision. For instance, such injuries may include, for example, broken bones, soft tissue injuries, etc. arising from rotation of the steering wheel itself and/or from deployment of an airbag. As one example, one of the driver's hands may be positioned on the steering wheel at 12 o'clock position either before a collision or after the collision. This hand placement or other hand placements may lead to hand, wrist, and/or arm injuries if an airbag is deployed.

The vehicle systems and control methods according to the present disclosure leverage steer-by-wire systems to reduce accident injury risk to a driver by temporarily decoupling of a steering wheel and road wheels of a vehicle immediately prior to a collision and then actively moving the steering wheel if needed so that the driver's hands are in an optimized position prior to the collision. Then, after the collision, the vehicle systems and control methods realign the steering wheel and the road wheels (if necessary) and recouple the steering wheel and the road wheels. By temporarily decoupling the steering wheel from the road wheels, the vehicle wheels and suspension can freely react to the impact without forcing a jerk motion of the steering wheel or otherwise imparting force through the steering wheel to the driver, while also enabling a steering wheel actuator to have high resistance to act as a brace for the driver during impact. Additionally, in some examples, the vehicle systems and control methods herein minimize the risk of serious upper extremity injury from, for example, an airbag deployment due to incorrect hand placement by actively moving the steering wheel prior to impact.

Figure 1:
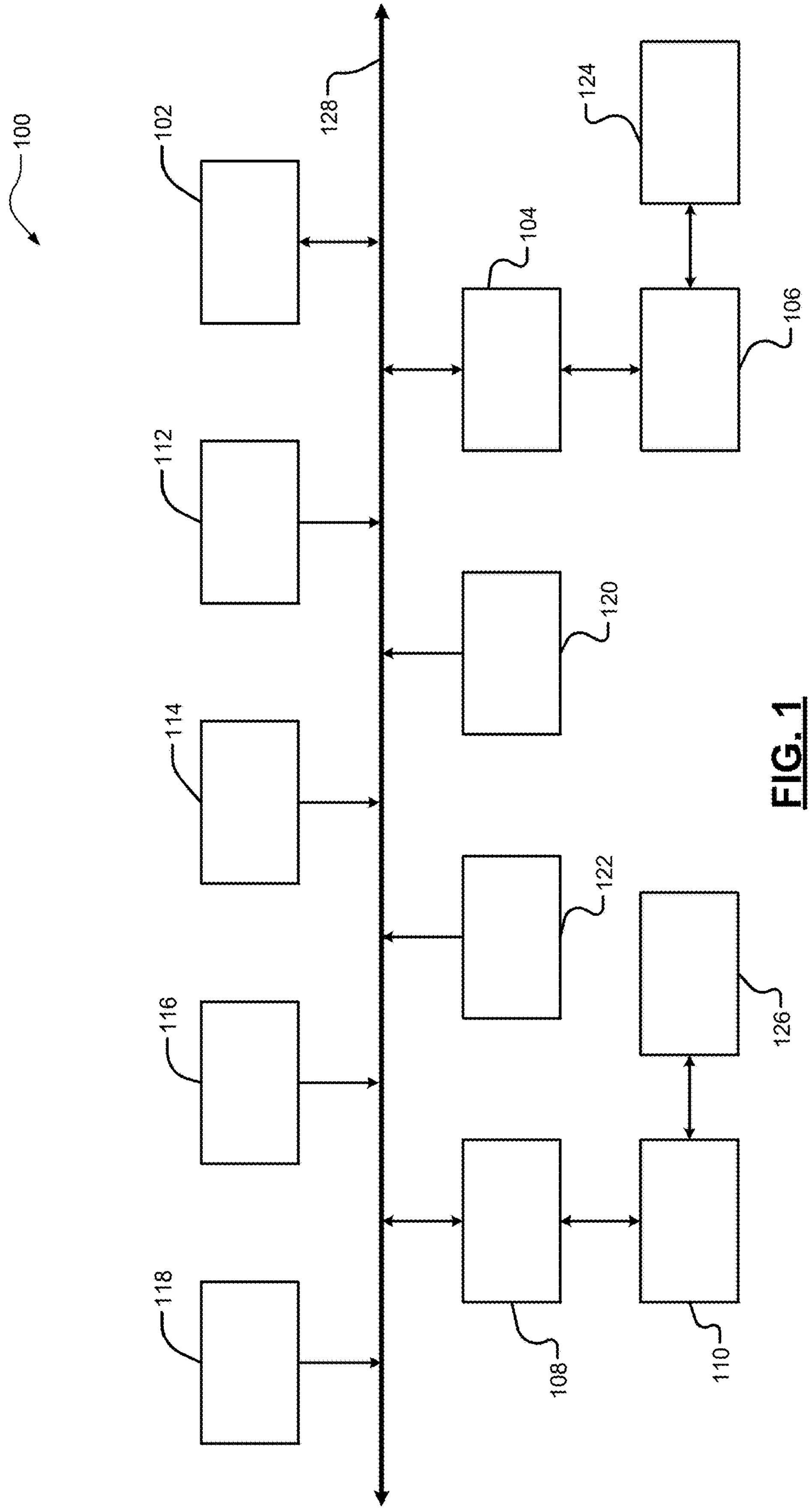
FIG. 1 is a block diagram of an example vehicle system for reducing an injury risk of a driver in a vehicle, according to the present disclosure.

Referring now to FIG. 1, a block diagram of an example vehicle system 100 is presented for reducing an injury risk of a driver in a vehicle. As shown in FIG. 1, the vehicle system 100 generally includes a control module 102, a steering wheel actuator control module 104, a steering wheel actuator 106, a road wheel actuator control module 108, and a road wheel actuator 110. Additionally, the vehicle system 100 of FIG. 1 includes various sensors for detecting or sensing driver and vehicle characteristics. For example, as shown in FIG. 1, the sensors may include a steering wheel sensor 112, a driver monitoring camera 114, a steering position sensor 116, a pinion angle sensor 118, an impact sensor 120, and a camera 122.

In the example of FIG. 1, the steering wheel actuator control module 104 is coupled to a steering wheel 124 via the steering wheel actuator 106. Likewise, the road wheel actuator control module 108 is coupled to one or more road wheels 126 via the road wheel actuator 110. In various embodiments, the road wheel actuator control module 108, the road wheel actuator 110, and the road wheel(s) 126 may be collectively referred to as a road wheel assembly herein.

Although FIG. 1 illustrates the vehicle system 100 as including specific modules, it should be appreciated that one or more other modules may be employed if desired. Additionally, while the vehicle system 100 is shown as including multiple separate modules, any combination of the modules (e.g., the control module 102, the steering wheel actuator control module 104, the road wheel actuator control module 108, etc.) and/or the functionality thereof may be integrated into one or more modules. Further, although the vehicle system 100 of FIG. 1 is shown as including particular sensors, it should be appreciated that the vehicle system 100 and/or other systems may include more or less sensors, sensors having different functionalities, etc. For instance, the vehicle system 100 may include multiple pinion angle sensors (e.g., one per road wheel, at least two per wheel, etc.), multiple impact sensors, multiple cameras, etc.

In various embodiments, the modules and sensors of the vehicle system 100 may be in communication with each other and may share parameters via a network 128, such as a controller area network (CAN). In such examples, the parameters may be shared via one or more data buses of the network 128. As such, various parameters may be made available by a given module and/or sensor to other modules and/or sensors via the network 128.

Figure 2:
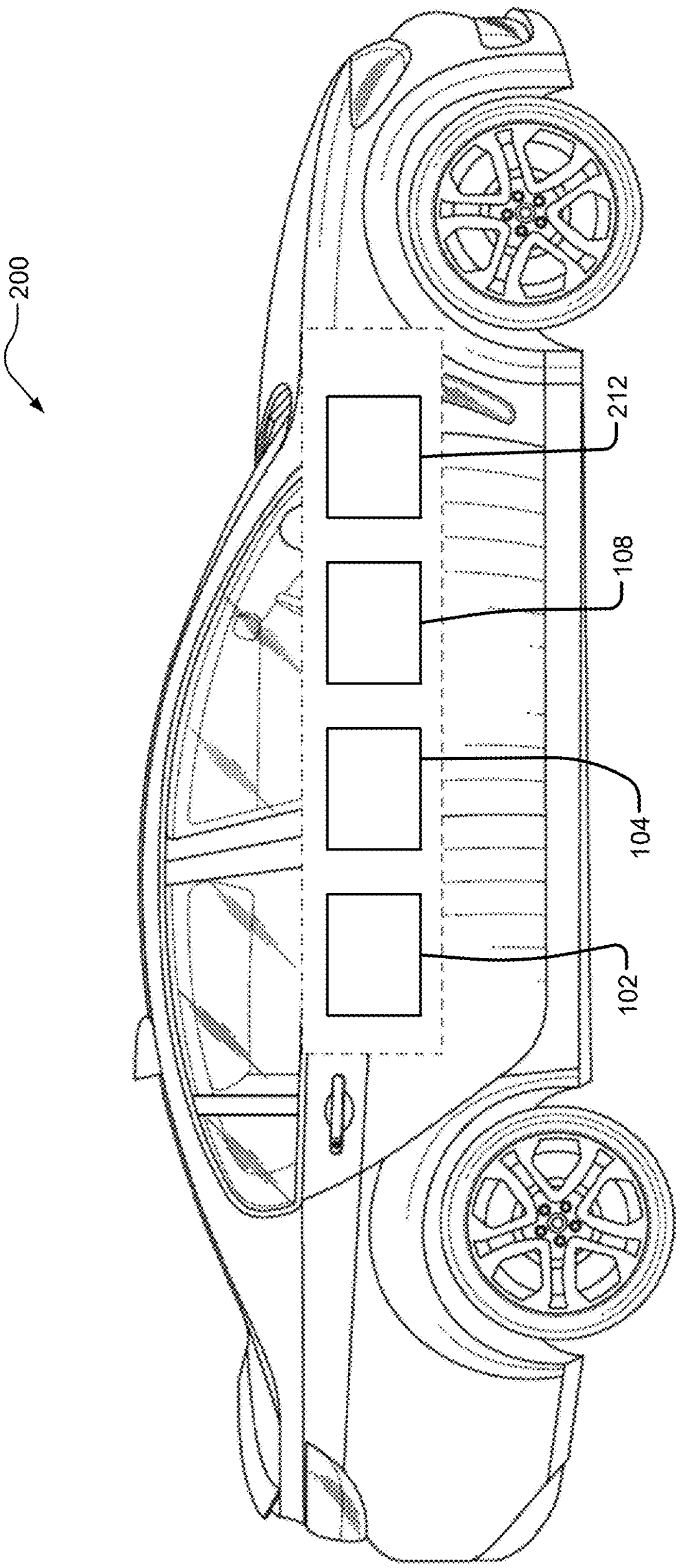
FIG. 2 is a vehicle including portions of the vehicle system of FIG. 1, according to the present disclosure.

The vehicle system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the vehicle system 100 may be applicable to an autonomous vehicle, a semi-autonomous vehicle, etc. For example, FIG. 2 depicts a vehicle 200 including the control module 102 of FIG. 1, the actuator control modules 104, 108 of FIG. 1, and sensors 212 in communication with the control module 102. In such examples, the sensors 212 may include any one or more of the sensors of FIG. 1.

With continued reference to FIG. 1, the vehicle system 100 implements a steer-by-wire system for steering control. In such examples, the actuator control modules 104, 108 are in bi-directional communication with each other to ensure a steering wheel angle and road wheel angles correspond. For instance, if a driver rotates the steering wheel 124 of the vehicle (e.g., the vehicle 200 of FIG. 2), the steering wheel actuator control module 104 generates and transmits a signal to the road wheel actuator control module 108, which in turn generates a control signal for the road wheel actuator 110 to move the road wheel(s) 126 of the vehicle and correspond to the rotation of the steering wheel 124. Conversely, if the road wheel(s) 126 move, the road wheel actuator control module 108 generates and transmits a signal to the steering wheel actuator control module 104, which in turn generates a control signal for the steering wheel actuator 106 to rotate the steering wheel 124 and correspond to the movement of the road wheel(s) 126.

The vehicle system 100 of FIG. 1 leverages this steer-by-wire system to reduce accident injury risk to the driver of the vehicle by taking active steps before a collision or another event that may force movement of the road wheel(s) 126. In such examples, the active steps may be implemented by at least the control module 102 without driver prompts or input.

For example, the control module 102 initially detects whether a collision is imminent with respect to the vehicle (e.g., the vehicle 200 of FIG. 2). In various embodiments, an imminent collision may refer to a high likelihood of airbag deployment. In such examples, the control module 102 may detect such an imminent collision about 1 second or less prior to the actual collision.

In various embodiments, the control module 102 may make this determination based on detected vehicle characteristics. For example, the control module 102 may receive one or more images from the camera 122 indicating a collision is imminent for the vehicle. In such examples, the camera 1222 may detect an object in the path of the vehicle. In other examples, the control module 102 may receive one or more signals from other suitable sensors that detect vehicle characteristics, such as sudden deacceleration of the vehicle, a hard braking incident, abrupt steering, a delta velocity between the vehicle and a dynamic object (e.g., a moving vehicle, etc.), a delta velocity between the vehicle and a static object (e.g., a wall, a tree etc.), etc. Additionally, in some examples, the control module 102 may also rely on driver characteristics in making this detection. For instance, the control module 102 may take into account the driver's attention (e.g., where is the driver looking, etc.), the driver's facial expressions, etc. captured by the driver monitoring camera 114.

The control module 102 also determines the driver's hand position on the steering wheel 124 of the vehicle in response to detecting a collision is imminent with respect to the vehicle. For instance, the control module 102 may determine a right-hand position and/or a left-hand position of the driver with respect to the steering wheel 124. This may occur only if an imminent collision is detected. Additionally, in some examples, the control module 102 may continually determine and evaluate the driver's hand position until, for example, the collision is detected.

In FIG. 1, the control module 102 can determine the driver's hand position based on driver characteristics. For example, the steering wheel sensor 112 may include one or more touch sensors (e.g., capacitive touch sensors, etc.) positioned on the steering wheel 124 to detect the driver's hand(s). In such examples, the control module 102 can determine the driver's hand position based on feedback from the touch sensors on the steering wheel 124. Additionally, the control module 102 may rely on information from the driver monitoring camera 114 to determine the driver's hand position. For instance, the driver monitoring camera 114 may capture images, video, etc. of the driver's hand(s) in relation to the steering wheel 124. In such examples, the control module 102 may employ image processing to determine the driver's hand position on the steering wheel 124.

Figure 3:
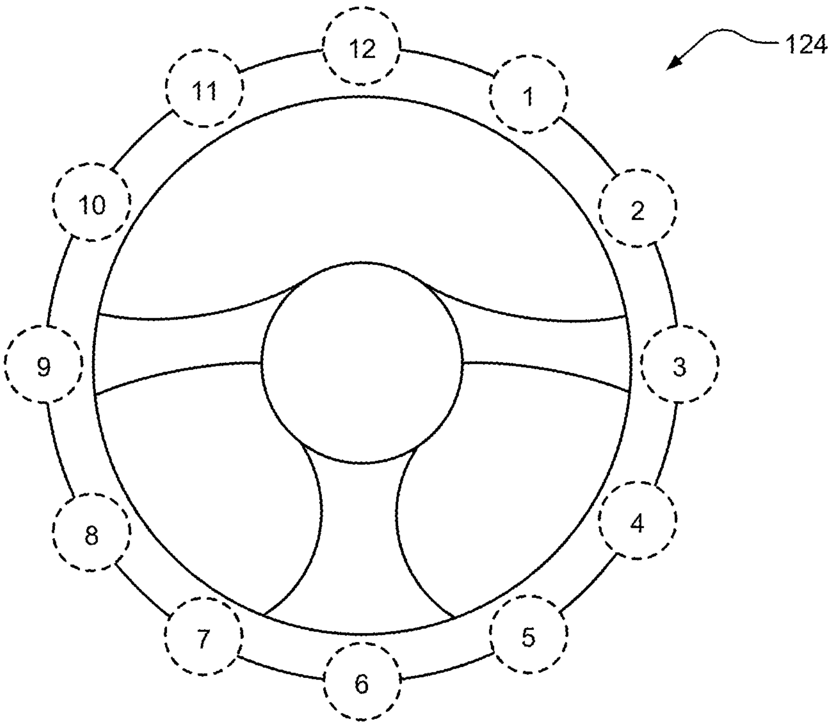
FIGS. 3-4 are block diagrams of a steering wheel controllable by the vehicle system of FIG. 1, according to the present disclosure.

In various embodiments, the control module 102 may represent the driver's hand position based on a clock position associated with the steering wheel 124. For example, FIG. 3 depicts an example of the steering wheel 124 of FIG. 1 have a default position in which the vehicle is traveling generally straight. In this example, the steering wheel 124 includes a circumference and a circular array of clock positions located about the circumference. In this example, the clock positions align with a traditional clock and include a 12 o'clock position at the top of the steering wheel 124, a 3 o'clock position at 90 degrees, a 6 o'clock position at the bottom of the steering wheel 124 (at 180 degrees), a 9 o'clock position at 270 degrees, and intervening clock positions therebetween.

With continued reference to FIG. 1, the control module 102 may also determine a vehicle path. In such examples, the control module 102 may rely on information from the steering position sensor 116 for this determination. For example, the steering position sensor 116 may include a Hall effect sensor or another suitable sensor for detecting an angular position (e.g., a steering wheel angle) of the steering wheel 124 and a path of the vehicle. This information may then be used to determine a relative hand position as further explained below. For instance, the steering wheel angle is zero when the vehicle path is generally straight, as shown by the steering wheel 124 of FIG. 3. In other examples, the steering wheel angle may be a value greater than zero when the vehicle path is not straight (e.g., when the vehicle is turning).

Figure 4:
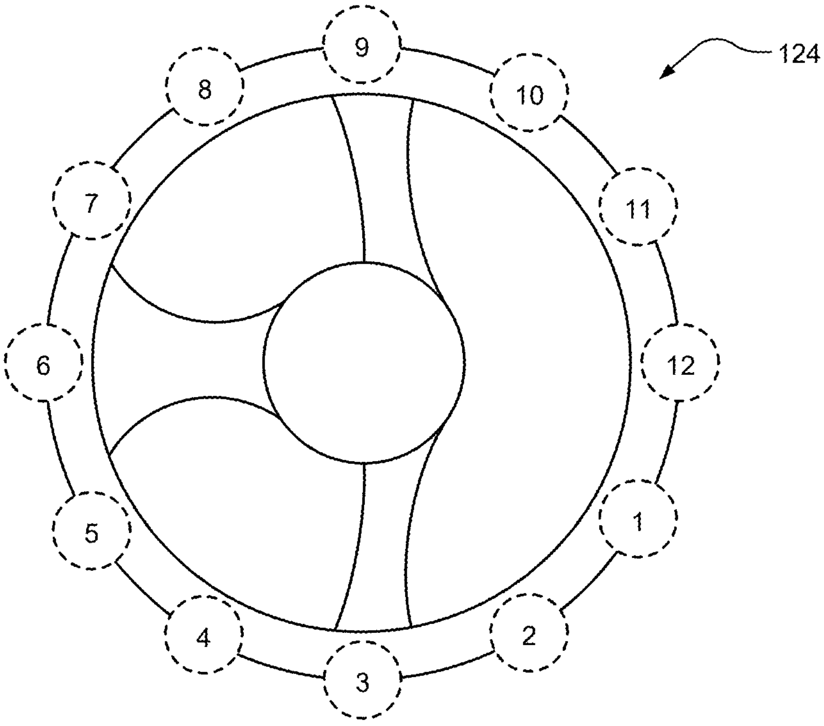

For example, FIG. 4 depicts an example of the steering wheel 124 of FIG. 1 similar to the steering wheel 124 of FIG. 3 but when the vehicle is turning to the right. In this example, the circular array of clock positions located about the circumference of the steering wheel 124 moves with rotation of the steering wheel 124. For instance, the 12 o'clock position is now at 90 degrees, the 3 o'clock position at the bottom of the steering wheel 124 (at 180 degrees), the 6 o'clock position is now at 270 degrees, and the 9 o'clock position is now at the top of the steering wheel 124. In the example of FIG. 4, the angular position or steering wheel angle of the steering wheel 124 is 90 degrees. In other examples, the steering wheel 124 may be rotated further or less, rotated to the left, etc. In such examples, the angular position or steering wheel angle of the steering wheel 124 may be 180 degrees (e.g., if the 12 o'clock position is at the bottom of the steering wheel 124), 270 degrees (e.g., if the 12 o'clock position is at 270 degrees), etc.

In the example of FIG. 1, the control module 102 then decouples the steering wheel 124 and the road wheel assembly in the vehicle to allow both to move independently of each other in response to detecting a collision is imminent. For example, if an imminent collision is detected, the control module 102 may sever communication between the steering wheel actuator control module 104 and the road wheel actuator control module 108. In other words, the control module 102 may interpret communication between the steering wheel actuator control module 104 and the road wheel actuator control module 108 such that the modules 104, 108 stop listening to each other and reacting based on movement of associated components of the other. In doing so, the road wheels 126 and suspension components of the vehicle can react to the impact without transferring torque through the steering wheel 124 and into the driver's hands and upper extremities.

In various embodiments, the vehicle system 100 may maintain vehicle control while the steering wheel 124 and the road wheel assembly are decoupled. For example, prior to and after decoupling of the steering wheel 124 and the road wheel assembly, the control module 102 (or another suitable module) may ensure a road wheel angle of the road wheels 126 follows a predetermined path for evasive steering or follows a desired vehicle path. As such, although vehicle steering control based on inputs from the steering wheel 124 may be suspended, the vehicle may remain on a desired or predetermined path.

In various embodiments, the control module 102 determines whether the driver's hand position is in an injury zone. In such examples, the injury zone may correspond to defined areas of the steering wheel 124 in which injury is likely to occur in the event of a collision. Such an injury may result from, for example, an airbag deployment. As an example, the injury zone may be a top portion and a bottom portion of the steering wheel 124. As such, in this example of FIG. 3 (e.g., when the vehicle is traveling straight), the injury zone may correspond to a range from the 11 o'clock position to the 1 o'clock position and a range from the 5 o'clock position to the 7 o'clock position on the steering wheel 124. While the o'clock positions may change when the vehicle path changes, the injury zone may remain at the top portion and the bottom portion of the steering wheel 124. For instance, in FIG. 4 (e.g., when the vehicle is turning right), the injury zone may correspond to a range from the 8 o'clock position to the 10 o'clock position and a range from the 2 o'clock position to the 4 o'clock position on the steering wheel 124.

Then, in response to determining that the driver's hand position is in the injury zone, the control module 102 controls the steering wheel 124 to move to a target position before the collision after the steering wheel 124 and the road wheel assembly are decoupled. This movement occurs while the driver is gripping the steering wheel 124. In such examples, the target position may correspond to the driver's hand position being at a desirable zone in which injury is less likely to occur in the event of a collision. For example, the desirable zone may be a left portion and a right portion of the steering wheel 124, such as the 3 and 9 o'clock positions of FIG. 3. In other examples, the desirable zone may be a range between the 2 and 4 o'clock positions and a range between the 8 and 10 o'clock positions of FIG. 3. Regardless of where the desirable zone is located, the control module 102 may control movement of the steering wheel 124 to the target position by generating a signal for the steering wheel actuator control module 104, which in turn controls the steering wheel actuator 106 to command the steering wheel 124 to rotate to the target position.

In various embodiments, the control module 102 controls the steering wheel 124 to move to the target position based on a current position of the steering wheel 124 and/or the driver's current hand position. For example, if the vehicle path is straight, the control module 102 may control steering wheel movement based on the driver's current hand position. However, if the vehicle path is turning, the control module 102 can take into account both the current steering wheel position and the driver's current hand position.

As one example, the control module 102 may control the steering wheel 124 based on one or both relative hand positions of the driver. For example, the relative hand position of each hand may be calculated based on the determined steering wheel angle and the determined hand position of the driver explained above. In such examples, a relative right-hand position may be determined according to equation (1) below and a relative left-hand position may be determined according to equation (2) below. Specifically, the relative right-hand position is determined by adding an angle of the right-hand position and the steering wheel angle, and the relative left-hand position is determined by adding an angle of the left-hand position and the steering wheel angle. For instance, if the steering wheel angle is zero degrees and the driver's right hand is at the 3 o'clock position in FIG. 3, the relative right-hand position is 90 degrees (90 degrees+0 degrees). If, however, the steering wheel angle is 90 degrees and the driver's right hand is at the 3 o'clock position in FIG. 4, the relative right-hand position is 180 degrees (90 degrees+90 degrees).

$$\text{Relative Right Hand Position} = RH\ \text{Angle} + \text{Steering Wheel Angle} \quad \text{Equation (1)}$$

$$\text{Relative Left Hand Position} = LH\ \text{Angle} + \text{Steering Wheel Angle} \quad \text{Equation (2)}$$

Then, the control module 102 may determine a delta angle based on the determined relative hand position and a target position for controlling movement of the steering wheel 124. For example, a delta angle for each hand may be determined according to equations (3)-(4) below. In this example, the right-hand delta angle is calculated based on a difference between a right-hand target value and the relative right-hand position of equation (1) above. Additionally, the left-hand delta angle is calculated based on a difference between a left-hand target value and the relative left-hand position of equation (2) above.

$$RH\ \text{Delta Angle} = RH\ \text{Target} - \text{Relative Right Hand Position} \quad \text{Equation (3)}$$

$$LH\ \text{Delta Angle} = LH\ \text{Angle} - \text{Reltive Left Hand Position} \quad \text{Equation (4)}$$

In such examples, the right-hand and left target values may be calibratable values corresponding to a desired location or zone in which injury is less likely to occur in the event of a collision, as explained above. For instance, the desirable zone for the driver's right hand may be 90 degrees (e.g., at the 3 o'clock position of FIG. 3) or another suitable value or range. Likewise, the desirable zone for the driver's left hand may be 270 degrees (e.g., at the 9 o'clock position of FIG. 3) or another suitable value or range. Thus, if the relative right-hand position is 90 degrees and the right-hand target value is 90 degrees, the right-hand delta angle is 0 degrees. However, if the relative right-hand position is 180 degrees and the right-hand target value is 90 degrees, the right-hand delta angle is 90 degrees.

Then, the control module 102 can control movement of the steering wheel 124 based on one or both delta angles. For instance, if only one hand is on the steering wheel 124, the control module 102 can control movement of the steering wheel 124 based on the determined delta angle for that hand. For example, if the right hand is the only hand on the steering wheel 124, the control module 102 can control movement of the steering wheel 124 based on the determined right-hand delta angle.

In other examples, both hands may be on the steering wheel 124. In such examples, the control module 102 attempts to find a single delta angle that optimizes the driver's hand position for both the right hand and the left hand. In other words, the control module 102 attempts to solve for or otherwise determine a single delta angle that places each hand in a desired location or zone. In such examples, the desirable zone (e.g., a target right-hand position) for the driver's right hand may open to a range from 60 degrees to 120 degrees (or another suitable range) and the desirable zone (e.g., a target left-hand position) for the driver's left hand may open to a range from 240 degrees to 300 degrees (or another suitable range). Once the single delta angle that places both hands in desired zones (or near the desired zones) is determined, the control module 102 can control movement of the steering wheel 124 based on this delta angle.

In various embodiments, the steering wheel actuator 106 is controlled based on the determined delta angle to move the steering wheel 124. For instance, once the delta angle for both hands or the delta angle for one specific hand is determined as explained above, the control module 102 generates a signal for the steering wheel actuator control module 104 based on this delta angle, which in turn controls the steering wheel actuator 106 to command the steering wheel 124 to rotate.

In some examples, the steering wheel actuator 106 may be controlled to achieve the desired movement of the steering wheel 124 with minimal rotational overshoot. For example, the steering wheel actuator 106 may be controlled to rotate the steering wheel 124 fast enough to achieve the desired location before the collision (e.g., within 0.5 seconds, etc. of impact) but also slow enough to minimize overshoot. To do so, the steering wheel actuator control module 104 may rely on a lookup table and the delta angle to determine a stepped response (e.g., a command) for the steering wheel actuator 106 to ensure such parameters are met. In doing so, the steering wheel actuator control module 104 transforms the delta angle into a times series command for the steering wheel actuator 106. For example, assuming a maximum rate of 360 degrees per second and a maximum overshoot of 10 degrees, the steering wheel actuator control module 104 may rely on the lookup table to ascertain the response based on the delta angle and then increase the response in steps to ensure the parameters are met while not inadvertently activating a failsafe procedure due to the steering wheel actuator 106 changing too quickly.

After the steering wheel 124 is moved to the target position such that the driver's hand(s) are in desirable zone(s), the vehicle system 100 may take steps to brace for impact. For example, the steering wheel actuator control module 104 (or the control module 102) may increase a resistive torque (e.g., a force) applied to the steering wheel 124 to, for example, a maximum value. This increased resistive torque tightens the steering wheel 124 to hold it in place. At this same time, a boosted steering assistance may be removed or substantially decreased to ensure the steering wheel 124 is held in place.

Then, after a collision is detected, the vehicle system 100 may begin the process of realigning the steering wheel 124 to the current vehicle path and recoupling the steering wheel 124 and the road wheel assembly. For example, the control module 102 may initially detect the collision based on vehicle characteristics detected by one or more sensors, such as the impact sensor 120, the camera 122, etc. For instance, the impact sensor 120 may detect a force on the vehicle, a deployment of the airbag, etc.

After the collision is detected, the control module 102 determines a realignment angle to move the steering wheel 124 back in alignment with the current vehicle path. For example, the control module 102 may initially determine a target steering wheel angle based on the vehicle path after the collision. This determination may be made based on roadwheel angles detected by the pinion angle sensor 118. Then, the control module 102 can determine the realignment angle according to equation (5) below. Specifically, as shown below, the realignment angle is determined by calculating a difference between the target steering wheel angle and the steering wheel angle at the time of the collision (e.g., after the steering wheel 124 has been moved).

$$\text{Realignment Angle} = \text{Target Steering Wheel Aangle} - \text{Steering Wheel Angle} \quad \text{Equation (5)}$$

Next, the control module 102 controls the steering wheel 124 to move based on the determined realignment angle. In such examples, the steering wheel 124 may be controlled to move in a similar as before the collision, as explained above. For instance, the steering wheel actuator 106 may be controlled based on the determined realignment angle to move the steering wheel 124. More specifically, the control module 102 generates a signal for the steering wheel actuator control module 104 based on the realignment angle, which in turn controls the steering wheel actuator 106 to command the steering wheel 124 to rotate.

To do so, the steering wheel actuator control module 104 may rely on the lookup table to transform the realignment angle into a times series command for the steering wheel actuator 106. For example, the steering wheel actuator control module 104 may search the lookup table based on the realignment angle to determine another stepped response (e.g., another command) for the steering wheel actuator 106 to ensure the steering wheel 124 is moved fast enough to quickly achieve the desired location after the collision (e.g., within 0.5 seconds, etc. after impact) but also slow enough to minimize overshoot. For example, assuming again a maximum rate of 360 degrees per second and a maximum overshoot of 10 degrees, the steering wheel actuator control module 104 may rely on the lookup table to ascertain the response based on the realignment angle and then increase the response in steps to ensure the parameters are met while not inadvertently activating a failsafe procedure due to the steering wheel actuator 106 changing too quickly.

Then, after the steering wheel 124 is realigned with the current vehicle path, the vehicle system 100 recouples the steering wheel 124 and the road wheel assembly. More specifically, after realignment, the control module 102 recouples the steering wheel 124 and the road wheel assembly again to reestablish bi-directional communication between the actuator control modules 104, 108. With this communication, the steering wheel angle of the steering wheel 124 and road wheel angles of the road wheel(s) 126 can again correspond with each other, as explained above.

FIGS. 5-8 illustrate example control processes 500, 600, 700 employable by the vehicle system 100 of FIG. 1 for reducing an injury risk of a driver in a vehicle. Although the example control processes 500, 600, 700 are described in relation to the vehicle system 100 of FIG. 1 including the control module 102 and the actuator control modules 104, 108, any one of the control processes 500, 600, 700 may be employable by another suitable system and/or module of the vehicle system 100.

Figure 5:
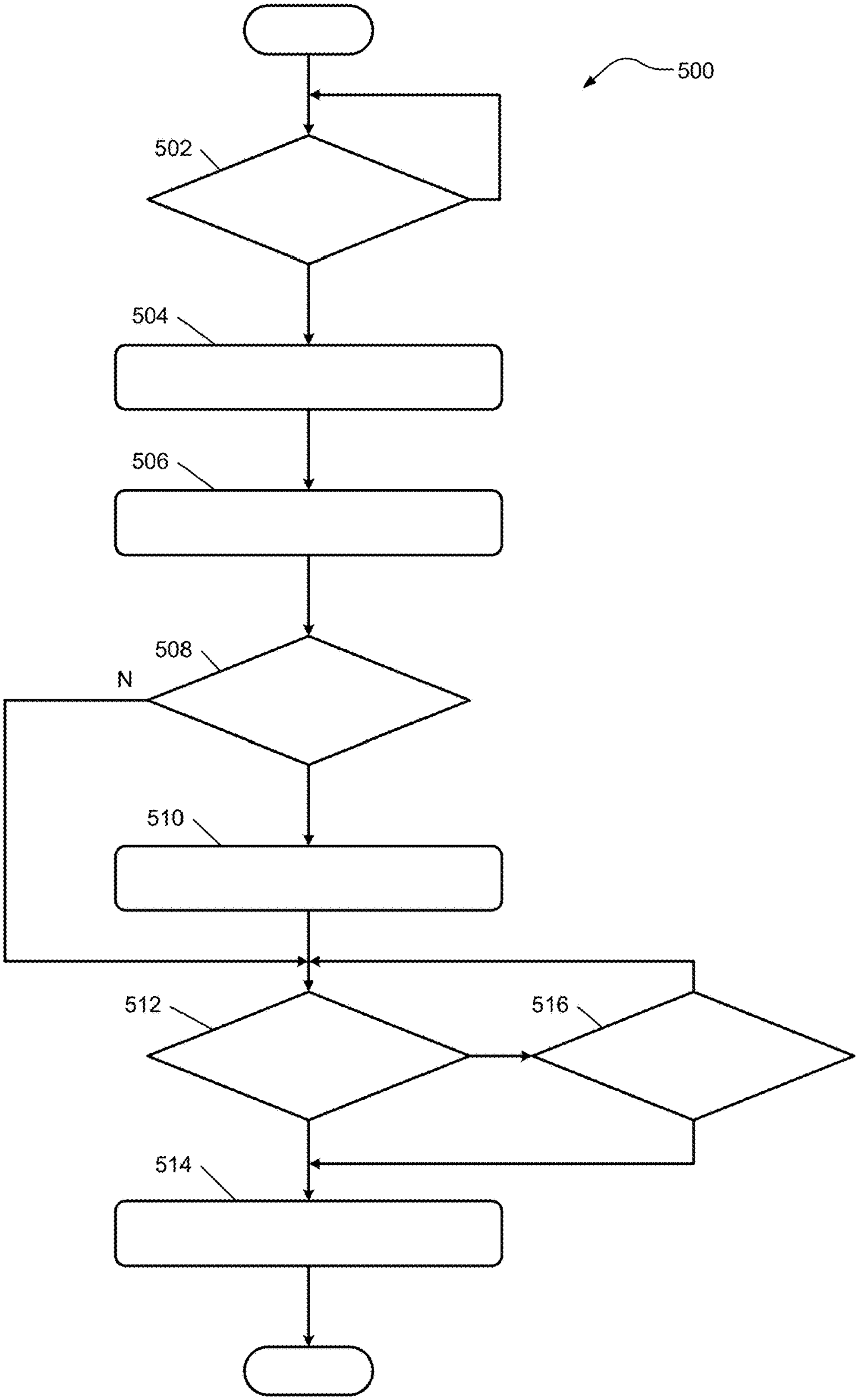
FIGS. 5-8 are flowcharts of example control processes for reducing an injury risk of a driver in a vehicle, according to the present disclosure.

As shown in FIG. 5, the control process 500 begins at 502 by detecting whether a collision is imminent with respect to the vehicle. For example, the control module 102 may receive one or more images representative of vehicle characteristics from the camera 122 and/or other suitable sensors indicating a collision is imminent (e.g., a high likelihood of airbag deployment), as explained above. If an imminent collision is detected (yes at 502), the control process 500 proceeds to 504. Otherwise, if an imminent collision is not detected (no at 502), the control process 500 returns to 502.

At 504, the control module 102 determines a hand position of the driver the steering wheel 124 in the vehicle. For example, and as explained above, the control module 102 may determine a right-hand position and/or a left-hand position of the driver based on cone or more signals from the steering wheel sensor 112, one or more images from the driver monitoring camera 114, etc. The control process 500 then proceeds to 506.

At 506, the control module 102 decouples the steering wheel 124 and the road wheel assembly in the vehicle to allow both to move independently of each other. In such examples, the control module 102 may sever communication between the steering wheel actuator control module 104 and the road wheel actuator control module 108, as explained above. Then, the control process 500 proceeds to 508.

At 508, the control module 102 determines whether the driver's hand position is in an injury zone corresponding to defined areas of the steering wheel 124 in which injury is likely to occur in the event of a collision. In such examples, the injury zone may be top and bottom portions of the steering wheel, as explained above. If yes at 508, the control process 500 then proceeds to 510. If no at 508, the control process 500 then proceeds to 512.

At 510, the control module 102 controls the steering wheel actuator 106 to move the steering wheel 124 to a target position. For example, and as explained above, the target position may correspond to the driver's hand position being at defined areas of the steering wheel 124 in which injury is less likely to occur in the event of a collision, such as at left and right portions of the steering wheel 124. In such examples, the control module 102 may control movement of the steering wheel 124 to the target position by generating a signal for the steering wheel actuator control module 104, which in turn controls the steering wheel actuator 106 to command the steering wheel 124 to rotate to the target position, as explained above. The control process 500 then proceeds to 512.

At 512, the control module 102 detects whether a collision occurred. For example, the control module 102 may detect a collision based on vehicle characteristics detected by one or more sensors, such as the impact sensor 120, the camera 122, etc., as explained above. If a collision is detected (yes at 512), the control process 500 proceeds to 514. If, however, a collision is not detected (no at 512), the control process 500 proceeds to 516, where the control module 102 determines whether a time period after the imminent collision detection (at 502) is greater than a defined threshold. If yes, the control process 500 proceeds to 514. If no at 516, the control module 102 returns to 512.

At 514, the control module 102 recouples the steering wheel 124 and the road wheel assembly again to reestablish bi-directional communication between the actuator control modules 104, 108. In some examples, the control module 102 may realign the steering wheel 124 with the current vehicle path prior to recoupling the steering wheel 124 and the road wheel assembly, as explained above. The control process 500 then ends as shown in FIG. 5.

Figure 6:
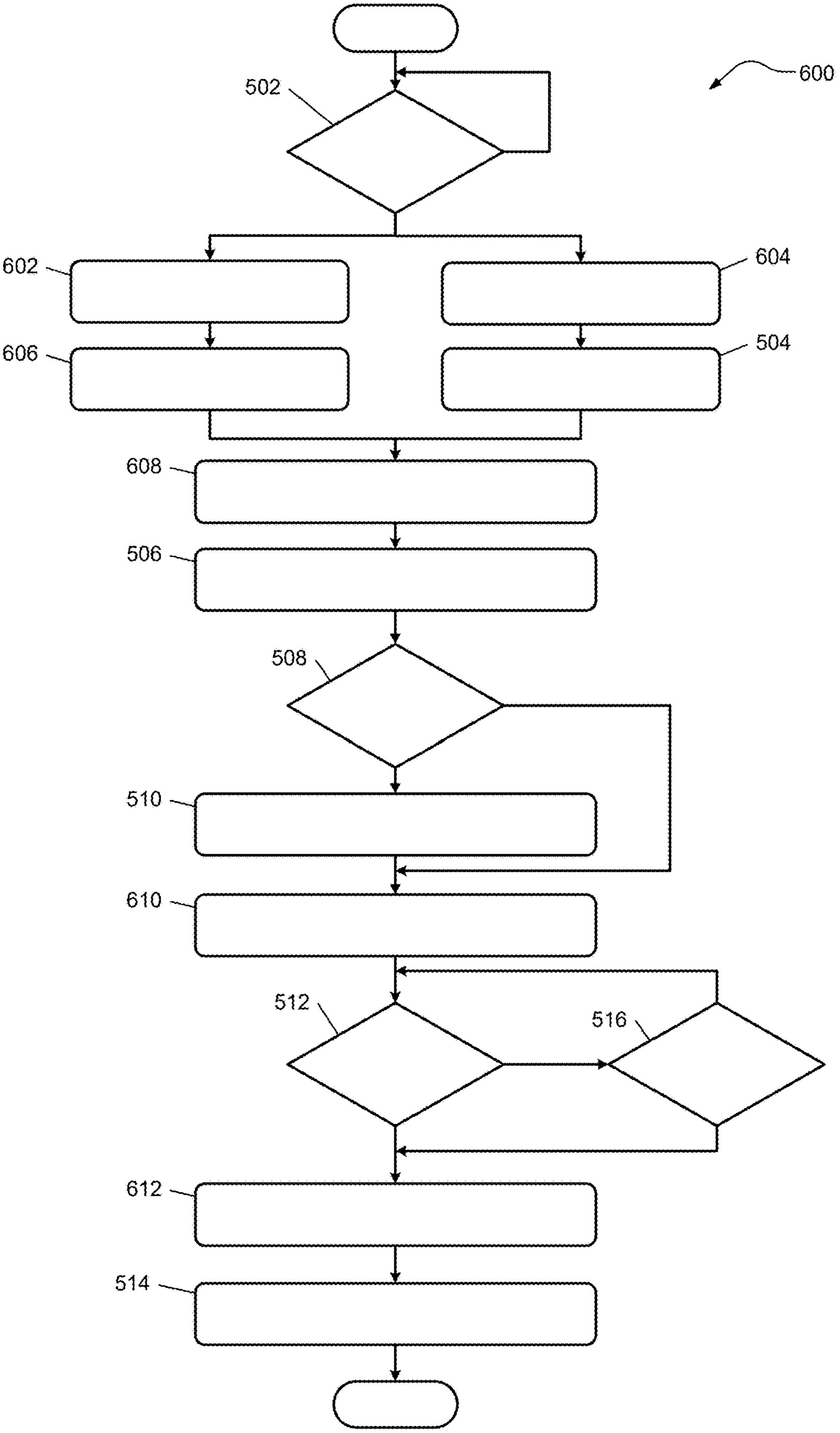

The control process 600 of FIG. 6 is similar to the control process 500 of FIG. 5 but includes additional steps. For example, as shown in FIG. 6, the control process 600 begins at 502 of FIG. 5 as explained above, and then proceeds to 602, 604 if an imminent collision is detected.

At 602, the control module 102 receives steering wheel angle data from, for example, the steering position sensor 116. The control process 600 then proceeds to 606, where the control module 102 determines a vehicle path based on the steering wheel angle of the steering wheel 124. The control process 600 then proceeds to 608, 506, 508.

At 604, the control module 102 receives touch sensor data from, for example, the steering wheel sensor 112 and/or data from the driver monitoring camera 114. The control process 600 then proceeds to 504 of FIG. 5, where the control module 102 determines a hand position of the driver the steering wheel 124 based on the received data. The control process 600 then proceeds to 608, 506, 508.

At 608, the control module 102 controls the road wheels 126 according to a predetermined path for evasive steering or a desired vehicle path based on the driver's intent. The control module 102 decouples the steering wheel 124 and the road wheel assembly at 506 and determines whether the driver's hand position is in an injury zone at 508, as explained above. If yes at 508, the control process 600 proceeds to 510 of FIG. 5 as explained above and then proceeds to 610. If no at 508 (e.g., the driver's hand position is not in the injury zone), the control process 600 proceeds to 610.

At 610, the control module 102 holds the steering wheel actuator 106 steady with an increased resistive torque (e.g., a force) applied to the steering wheel 124. As such, the steering wheel 124 is held in place before a potential collision, as explained above. The control process 600 then proceeds to 512 of FIG. 5, where the control module 102 detects whether a collision occurred, as explained above. If yes, the control process 600 proceeds to 612. If no, the control process 600 proceeds to 516 of FIG. 5, where the control module 102 determines whether a time period after the imminent collision detection is greater than a defined threshold. If yes, the control process 500 proceeds to 612. If no, the control module 102 returns to 512.

At 612, the control module 102 realigns the steering wheel 124 with the current vehicle path. For example, and as explained above, the control module 102 may determine a realignment angle to move the steering wheel 124 back in alignment with the current vehicle path according to equation (5), and then control the steering wheel 124 to move based on the determined realignment angle. The control process 600 then proceeds to 514 of FIG. 5, where the control module 102 recouples the steering wheel 124 and the road wheel assembly as explained above. The control process 500 then ends as shown in FIG. 5.

Figure 7:
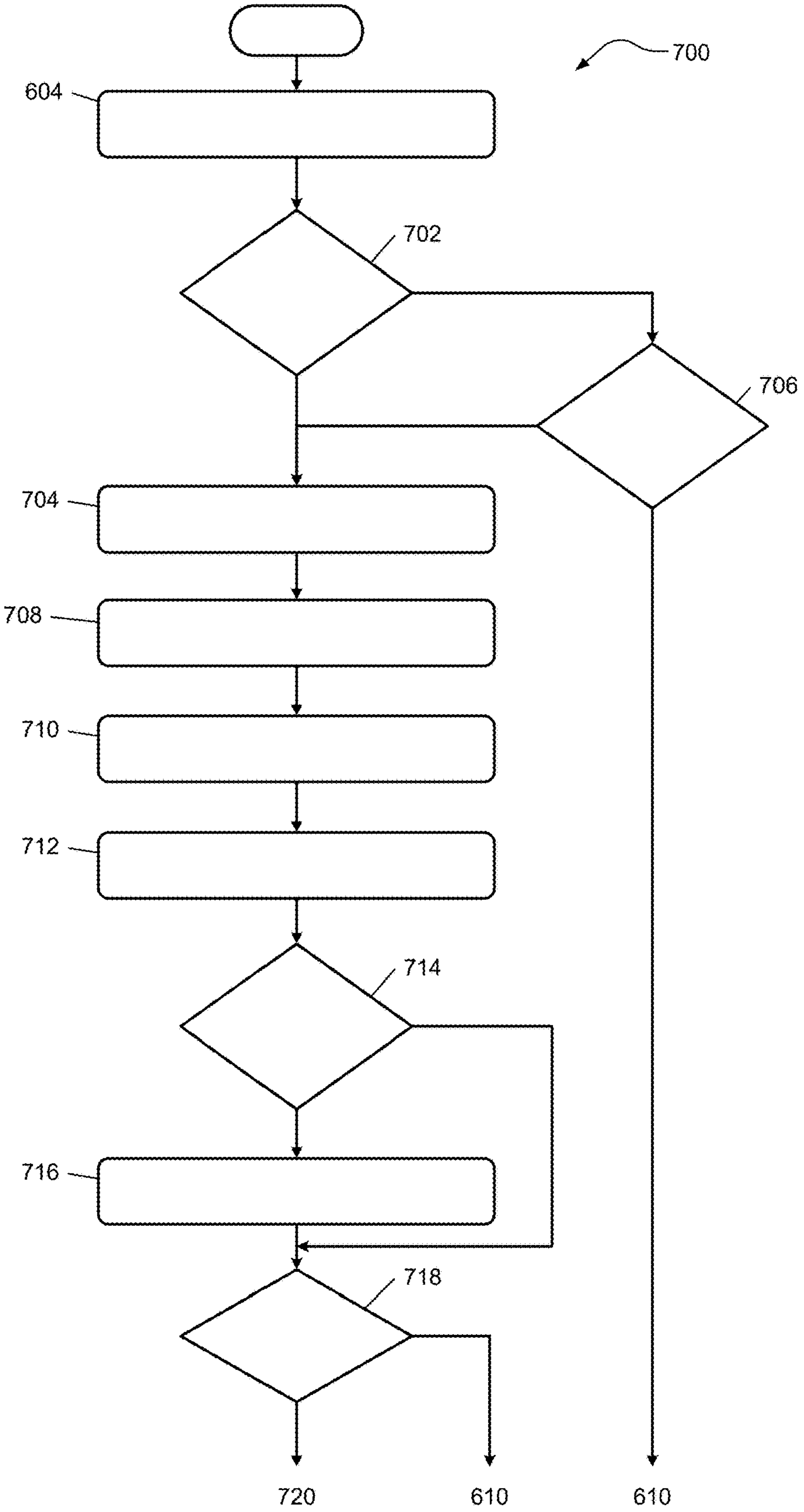
Figure 8:
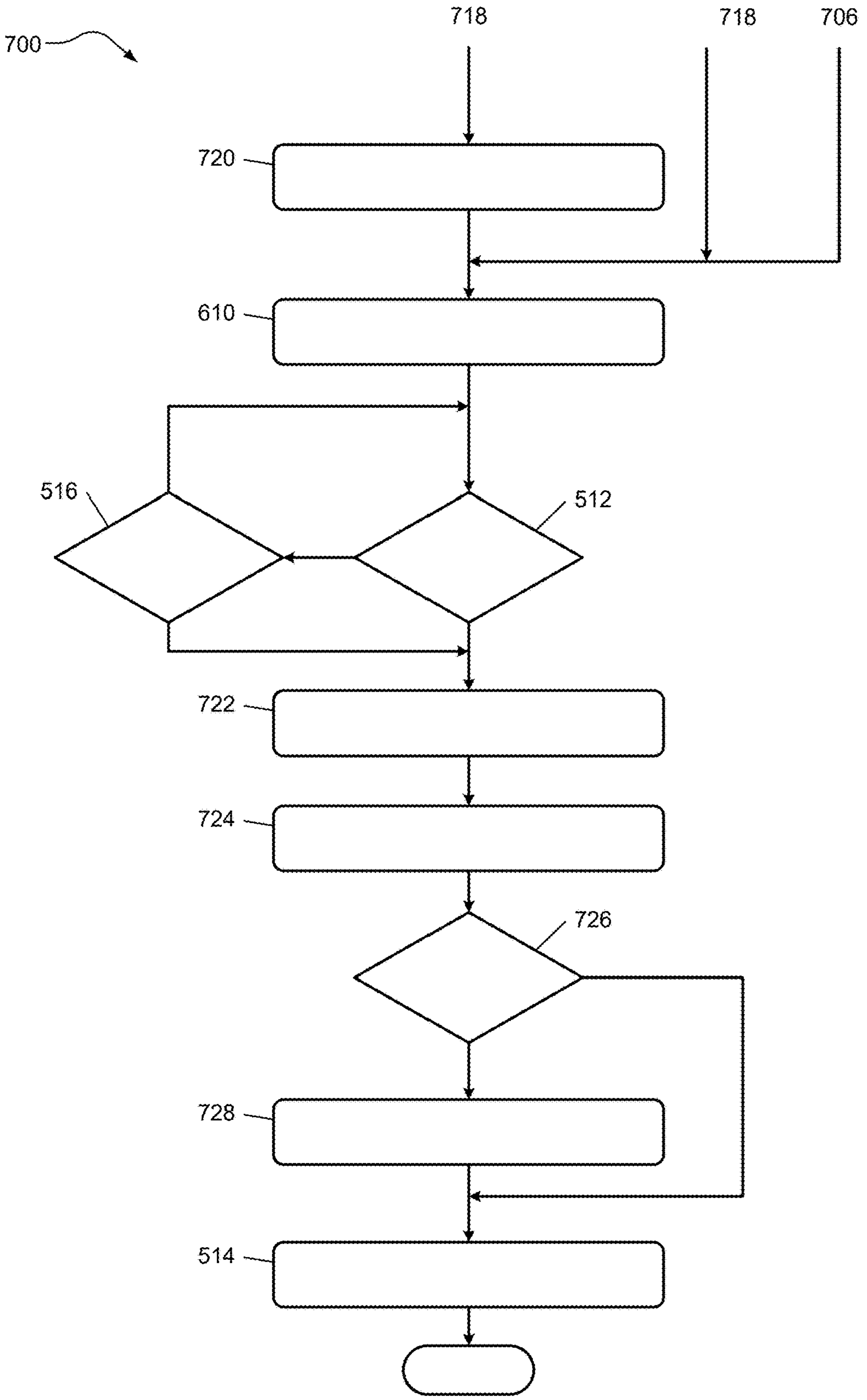

The control process 700 of FIGS. 7-8 is similar to the control processes 500, 600 of FIGS. 5-6 but includes additional steps. For example, in FIGS. 7-8, an imminent collision with a high likelihood of airbag deployment has been detected and the steering wheel 124 and the road wheel assembly have been decoupled. As such, the control process 700 of FIGS. 7-8 is shown as beginning at 604 of FIG. 6 as explained above. Then, the control process 700 proceeds to 702.

At 702, the control module 102 determines if two hands are detected on the steering wheel 124. For example, the control module 102 may implement a hands-on detection algorithm to detect the number of hands on the steering wheel 124 based on the touch sensor data and/or camera data received at 604. For instance, the received touch sensor data may indicate touch areas on substantially opposing sides of the steering wheel 124. If so, the control module 102 may determine that two hands are on the steering wheel 124. In other examples, the received data may indicate only one hand on the steering wheel 124 or no hands on the steering wheel 124. If the control module 102 does detect two hands on the steering wheel 124 (yes at 702), the control process 700 proceeds to 704. If, however, the control module 102 does not detect two hands on the steering wheel 124 (no at 702), the control process 700 proceeds to 706 where the control module 102 determines if one hand is detected on the steering wheel 124 based on the hands-on detection algorithm explained above. If yes at 706, the control process 700 proceeds to 704. If no at 704 (e.g., no hands are the wheel), the control process 700 proceeds to 610.

At 704, the control module 102 determines the driver's hand location and assigns an angular value. For example, if two hands are detected, the control module 102 determines the driver's right-hand and left-hand locations on the steering wheel 124 and then assigns angular values for each. If, however, only one hand is detected, the control module 102 determines the driver's hand location for the right hand or the left hand, and then assigns an angular value for that hand location. In such examples, the driver's hand location may be detected based on the received touch sensor data and/or camera data. In such examples, the assigned angular values correspond to degrees from 0 to 360 degrees (clockwise) relative to the steering wheel 124. The control process 700 then proceeds to 708, 710, 712.

At 708, the control module 102 determines a steering wheel angle for the steering wheel 124 based on, for example, data from the steering position sensor 116. Then, at 710, the control module 102 determines a relative hand position for each of the driver's hands on the steering wheel 124. For example, if only the right hand is on the steering wheel 124, the control module 102 can implement equation (1) above to determine the relative right-hand position based on the steering wheel angle and the assigned angular value for the right hand. Alternatively, if both hands are on the steering wheel 124, the control module 102 can implement equations (1)-(2) above to determine the relative right-hand position and the relative left-hand position based on the steering wheel angle and the assigned angular values for the hands.

At 712, the control module 102 determines a delta angle for each of the driver's hands on the steering wheel 124. For example, if only the right hand is on the steering wheel 124, the control module 102 can implement equation (3) above to determine a delta angle based on the relative right-hand position and a target right-hand position. If, however, both hands are on the steering wheel 124, the control module 102 can implement equations (3)-(4) above to determine a delta angle for each hand based on the relative hand positions and target right-hand positions, as explained above. The control process 700 then proceeds to 714.

At 714, the control module 102 determines if two hands are detected on the steering wheel 124. This determination may be carried over from 702 explained above. If two hands are detected (yes at 714), the control process 700 proceeds to 716. If, however, two hands are not detected (no at 714), the control process 700 proceeds to 718.

At 716, the control module 102 determines a single delta angle that satisfies range targets for both hands. In other words, the control module 102 attempts to find a single delta angle that places each hand in a desired location or zone, such as in a range from 60 degrees to 120 degrees and in a range from 240 degrees to 300 degrees. This single delta angle may be determined based on the previous delta angle for the right and left hands and the range targets (or desired locations) for the hands. The control process 700 then proceeds to 718.

At 718, the control module 102 determines if the determined delta angle (of 716) for both hands or the delta angle (of 712) for the single hand on the steering wheel 124 is less than or equal to a defined threshold, such as 180 degrees. If the delta angle is greater than the defined threshold, the driver may incur injuries due to the substantial movement of the steering wheel 124. If yes at 718, the control process 700 proceeds to 720 (of FIG. 8). If no, the control process 700 proceeds to 610 (of FIG. 8).

At 720, the control module 102 controls the steering wheel actuator 106 to move the steering wheel 124 based on the determined delta angle (of 716) for both hands or the delta angle (of 712) for the single hand on the steering wheel 124. For example, and as explained above, the control module 102 may generate a signal for the steering wheel actuator control module 104 based on the appropriate delta angle, which in turn controls the steering wheel actuator 106 to command the steering wheel 124 to rotate. In such examples, the steering wheel actuator control module 104 may rely on a lookup table and the delta angle to determine a stepped response (e.g., a command) for the steering wheel actuator 106, as explained above. The control process 700 then proceeds to 610.

At 610, the control module 102 holds the steering wheel actuator 106 steady with an increased resistive torque (e.g., a force) applied to the steering wheel 124, as explained above. The control process 700 then proceeds to 512, 516 of FIG. 5 as explained above, and then to 722.

At 722, the control module 102 determines a target steering wheel angle based on a vehicle path after the collision. For example, and as explained above, the vehicle path may be determined based on roadwheel angles detected by the pinion angle sensor 118, which can the be used to determine the target steering wheel angle. The control process 700 then proceeds to 724, where the control module 102 determines a realignment angle based on the target steering wheel angle. For instance, the control module 102 may employ equation (5) above to determine the realignment angle based on the target steering wheel angle and the steering wheel angle at the time of the collision. The control process 700 then proceeds to 726.

At 726, the control module 102 determines if realignment of the steering wheel 124 is necessary. For instance, if the realignment angle determined at 724 is zero, the control module 102 may determine that realignment is not necessary. In such examples, the control process 700 proceeds to 514. Otherwise, if realignment is necessary (e.g., the realignment angle is greater than zero), the control process 700 proceeds to 728.

At 728, the control module 102 controls the steering wheel actuator 106 to move the steering wheel 124 based on the determined realignment angle. For example, and as explained above, the control module 102 may generate a signal for the steering wheel actuator control module 104 based on the realignment angle, which in turn controls the steering wheel actuator 106 to command the steering wheel 124 to rotate. In such examples, the steering wheel actuator control module 104 may rely on a lookup table and the realignment angle to determine a stepped response (e.g., a command) for the steering wheel actuator 106, as explained above. The control process 700 then proceeds to 514.

At 514, the control module 102 recouples the steering wheel 124 and the road wheel assembly, as explained above. The control process 700 then ends as shown in FIG. 7.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for reducing an injury risk of a driver in a vehicle, the vehicle system comprising a control module configured to:
- detect whether a collision is imminent with respect to the vehicle;
- determine a hand position of the driver on a steering wheel in the vehicle;
- in response to detecting the imminent collision, decouple the steering wheel and a road wheel assembly in the vehicle to allow both to move independently of each other;
- in response to determining the hand position of the driver is in an injury zone, control the steering wheel to move to a target position before the collision;
- detect the collision; and
- in response to detecting the collision, determine a target steering wheel angle based on a vehicle path after the collision, determine a realignment angle based on the target steering wheel angle and a current steering wheel angle, and control the steering wheel to move based on the realignment angle.

2. The vehicle system of claim 1, wherein;
- the vehicle system further includes one or more sensors in communication with the control module;
- the one or more sensors include at least one of a touch sensor positioned on the steering wheel and a camera; and
- the control module is configured to determine a hand position of the driver on the steering wheel in the vehicle based on data from the one or more sensors.

3. The vehicle system of claim 1, wherein:
- the hand position corresponds to one hand of the driver; and
- the control module is configured to:
  - determine a steering wheel angle of the steering wheel;
  - determine a relative hand position based on the steering wheel angle and the determined hand position corresponding to the one hand of the driver; and
  - control the steering wheel to move based on the relative hand position.

4. The vehicle system of claim 3, wherein:
- the vehicle system further includes an actuator coupled to the steering wheel; and
- the control module is configured to:
  - determine a delta angle based on the relative hand position and the target position; and
  - control the actuator based on the delta angle to move the steering wheel.

5. The vehicle system of claim 1, wherein:
- the hand position of the driver includes a right-hand position and a left-hand position and the target position includes a target right-hand position and a target left-hand position; and
- the control module is configured to:
  - determine a steering wheel angle of the steering wheel;
  - determine a relative right-hand position of the driver based on the steering wheel angle and the right-hand position;
  - determine a relative left-hand position of the driver based on the steering wheel angle and the left-hand position; and
  - control the steering wheel to move based on the relative right-hand position, the relative left-hand position, the target right-hand position, and the target left-hand position.

6. The vehicle system of claim 5, wherein:
- the target right-hand position is a first defined range;
- the target left-hand position is a second defined range;
- the vehicle system further includes an actuator coupled to the steering wheel; and
- the control module is configured to:
  - determine a delta angle based on the relative right-hand position, the relative left-hand position, the first defined range, and the second defined range; and control the actuator based on the delta angle to move the steering wheel.

7. The vehicle system of claim 1, wherein the control module is configured to recouple the steering wheel and the road wheel assembly.

8. A vehicle system for reducing an injury risk of a driver in a vehicle, the vehicle system comprising:

one or more sensors configured to detect vehicle characteristics;

an actuator coupled to a steering wheel in the vehicle; and a control module configured to:

detect whether a collision is imminent with respect to the vehicle based on the detected vehicle characteristics;

in response to detecting the imminent collision, decouple the steering wheel and a road wheel assembly in the vehicle to allow both to move independently of each other and control the actuator to move the steering wheel to a target position before the collision; and in response to detecting the collision, determine a target steering wheel angle based on a vehicle path after the collision. determine a realignment angle based on the target steering wheel angle for a vehicle path after the collision, control the actuator to move the steering wheel based on the realignment angle to realign the steering wheel for the vehicle path after the collision, and recouple the steering wheel and the road wheel assembly.

9. The vehicle system of claim 8, wherein the control module is configured to:

determine a hand position of the driver on the steering wheel;

determine a steering wheel angle of the steering wheel;

determine a relative hand position based on the steering wheel angle and the determined hand position; and control the actuator to move the steering wheel to the target position based on the relative hand position.

10. A control method for reducing an injury risk of a driver in a vehicle, the control method comprising:

detecting whether a collision is imminent with respect to the vehicle;

determining a hand position of the driver on a steering wheel in the vehicle;

in response to detecting the imminent collision, decoupling the steering wheel and a road wheel assembly in the vehicle to allow both to move independently of each other;

in response to determining the hand position of the driver is in an injury zone, controlling the steering wheel to move to a target position before the collision;

detecting the collision; and in response to detecting the collision, determining a target steering wheel angle based on a vehicle path after the collision, determining a realignment angle based on the target steering wheel angle and a current steering wheel angle, and controlling the steering wheel to move based on the realignment angle.

11. The control method of claim 10, wherein determining the hand position of the driver on the steering wheel includes determining the hand position based on driver characteristics detected by at least one of a touch sensor positioned on the steering wheel and a camera.

12. The control method of claim 10, wherein:

the hand position corresponds to one hand of the driver;

the control method further includes determining a steering wheel angle of the steering wheel and determining a relative hand position of the driver based on the steering wheel angle and the determined hand position corresponding to the one hand of the driver; and controlling the steering wheel to move to the target position includes controlling the steering wheel to move based on the relative hand position.

13. The control method of claim 12, the control method further includes determining a delta angle based on the relative hand position and the target position; and controlling the steering wheel to move to the target position includes controlling an actuator coupled to the steering wheel based on the delta angle.

14. The control method of claim 10, wherein:

the hand position of the driver includes a right-hand position and a left-hand position and the target position includes a target right-hand position and a target left-hand position;

the control method further includes determining a steering wheel angle of the steering wheel, determining a relative right-hand position of the driver based on the steering wheel angle and the right-hand position, and determining a relative left-hand position of the driver based on the steering wheel angle and the left-hand position; and controlling the steering wheel to move to the target position includes controlling the steering wheel to move based on the relative right-hand position, the relative left-hand position, the target right-hand position, and the target left-hand position.

15. The control method of claim 14, wherein:

the target right-hand position is a first defined range;

the target left-hand position is a second defined range;

the control method further includes determining a delta angle based on the relative right-hand position, the relative left-hand position, the first defined range, and the second defined range; and controlling the steering wheel to move to the target position includes controlling an actuator coupled to the steering wheel based on the delta angle to move the steering wheel.

16. The control method of claim 10, further comprising recoupling the steering wheel and the road wheel assembly.

17. The vehicle system of claim 8, wherein the control module is configured to, in response to detecting the collision, access a lookup table to determine the times series command based on the realignment angle.

18. The vehicle system of claim 8, wherein the control module is configured to, in response to detecting the collision:

transform the realignment angle into a times series command for the actuator; and control the actuator to move the steering wheel based on the times series command.

19. The vehicle system of claim 8, wherein:

the one or more sensors include a pinion angle sensor configured to detect a roadwheel angle of a road wheel on the vehicle; and the control module is configured to, in response to detecting the collision, determine the vehicle path after the collision based on the roadwheel angle.

20. The vehicle system of claim 1, wherein:

the vehicle system further includes a pinion angle sensor configured to detect a roadwheel angle of a road wheel on the vehicle; and the control module is configured to, in response to detecting the collision:

determine the vehicle path after the collision based on the roadwheel angle;

transform the realignment angle into a times series command; and control the steering wheel to move based on the times series command.

* * * * *